May 13, 1958
H. R. EGGERS
2,834,942
MAGNETIZED CORE MEASURING INSTRUMENT
WITH T-SHAPED MOVING SYSTEM
Filed May 9, 1955
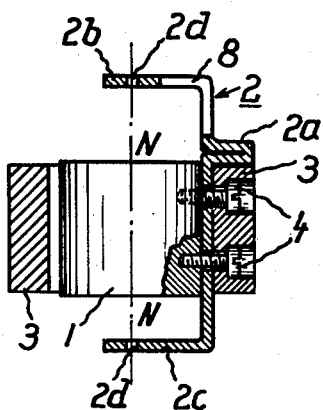
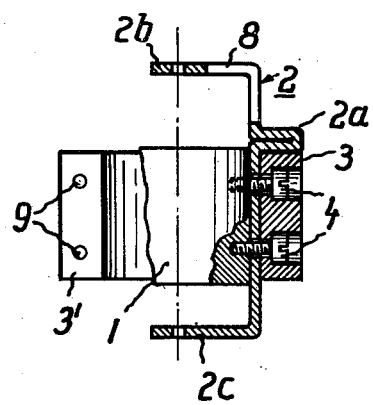
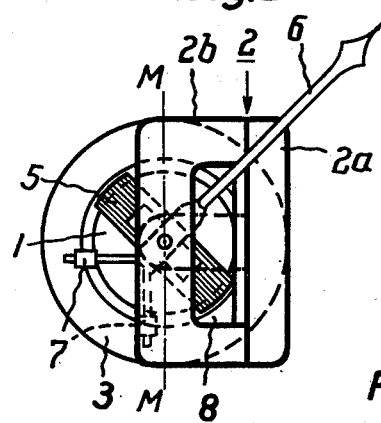
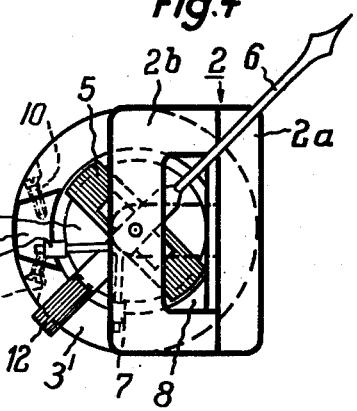
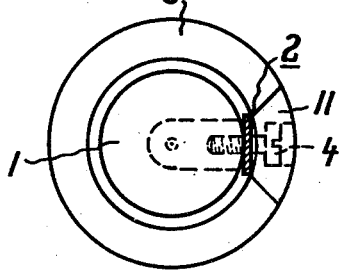
Inventor:
Hermann Ragnar Eggers
By Pierce, Scheffler & Parker
Attorneys.

United States Patent Office 2,834,942
Patented May 13, 1958

2,834,942

MAGNETIZED CORE MEASURING INSTRUMENT WITH T-SHAPED MOVING SYSTEM

Hermann Ragnar Eggers, Heiligenhaus, Germany, assignor to Licentia Patent-Verwaltungs-G. m. b. H., Hamburg, Germany Application May 9, 1955, Serial No. 506,944
In Germany October 1, 1948

Public Law 619, August 23, 1954
Patent expires October 1, 1968

3 Claims. (Cl. 324—151)

This invention relates to magnetized core measuring instruments with T-shaped moving systems, and more particularly to measuring instruments made up of standard parts which may be assembled to form different types of instruments for measuring values such as current and voltage or resistance.

This has been the practice in the manufacture of direct current measuring instruments having a magnetic system comprising a C-shaped or horseshoe permanent magnet and a soft iron core but the prior magnetized core instruments have not been adapted to employ a T-shaped moving system which has an auxiliary coil in addition to the coil which moves angularly in the gap between the magnetized core and an annular soft iron yoke.

Objects of the present invention are to provide measuring instruments of magnetized core type with which T-shaped moving systems or conventional single coil moving systems may be employed. Other objects are to provide measuring instruments having magnetic systems comprising a magnetized core supported within an iron yoke having a section removable for the assembly thereon of the auxiliary coil of a T-shaped moving system.

These and other objects and the advantages of the invention will be apparent from the following specification when taken with the accompanying drawing in which:

Fig. 1 is an elevation, with parts in central section, of the magnetic system and supporting bracket of a measuring instrument embodying the invention;

Fig. 2 is a plan view of the assembled instrument;

Fig. 3 is a central section through another form of magnetic system, a part of the magnetized core being broken away for the better illustration of the sectionalized yoke;

Fig. 4 is a plan view of a T-shaped moving system assembled on the magnetic structure of Fig. 3; and Fig. 5 is a plan view, with part in section, of another magnetic system of the Figs. 3 and 4 type.

In the drawing, the reference numeral 1 identifies a transversely magnetized cylindrical core mounted on a non-magnetic bracket 2 and coaxially of an annular soft iron yoke 3 by screws 4. The bracket 2 comprises a sheet metal stamping reinforced by an intermediate fold 2a against which the upper side of the yoke 3 is seated, and upper and lower flanges 2b, 2c which extend at right angles to the axis of the core 1 and are provided with openings 2d for receiving the bearings, not shown, by which a moving coil 5 is pivotally supported for angular movement in the air gap between the core 1 and yoke 3. The customary shafts and spiral springs, not shown, a pointer 6 and counterweights 7 are secured to the coil 5. The non-magnetic bracket 2 is provided with an opening 8 through which the pointer 6 extends. The plane of maximum magnetization of the core is indicated by line M—M in Fig. 2, and it is to be noted that the securing screws 4 enter the core substantially midway between its polar regions, i. e. where there are substantially no lines of magnetic flux across the annular air gap.

As shown in Figs. 3 and 4, the annular soft iron yoke 3' is provided with an air gap between opposed ends which are provided with threaded openings 9 through which studs 10 are passed to secure a wedge-shaped piece of soft iron 11 in the gap to complete the continuity of the annular iron yoke 3'. The moving system for use with this type of magnetic field system includes an auxiliary coil 12 in addition to the primary coil 5, the winding of coil 12 being normal to that of coil 5 and coil 12 being in line with and opposite the pointer 6, thus acting as a partial counterbalance for the same. The air gap is somewhat wider than the coil 12 and the latter is threaded upon the yoke 3' when the insert 11 is removed. The inner side of the coil travels in the annular air gap between core 1 and yoke 3' while its outer side is outside of yoke 3' and its insert 11.

Electrical connections are made to coils 5 and 12 in customary manner by spiral springs, not shown, and such springs may or may not exert a restoring force to return the moving system to a preselected position in the absence of current, according to the particular use for which the instrument is intended. In the case of a resistance measuring instrument the springs serve as current conductors but do not exert a restoring force since the current through the auxiliary coil 12 develops a torque in opposition to that developed by the current through coil 5.

For some applications of instruments with T-shaped moving systems, it is possible to omit the insert 11 and leave a gap in the iron yoke 3' at a region of low flux density opposite the point of mounting of the core and yoke on the bracket 2. This has the disadvantage, however, that the graduations of the instrument scale are widely spread since the auxiliary coil 12 will be located in the region of low flux density at the yoke gap during measuring operations.

It is therefore preferable to close the yoke gap with the insert 11, but it is not essential that the gap and insert be positioned as shown in Figs. 3 and 4. After assembly of the moving system on the core and yoke, the yoke may be turned to locate the insert 11 adjacent the point where the core and yoke are secured to the bracket 2 or, as shown in Fig. 5, the insert 11 may itself be drilled to receive the screws 4 which secure the core 1 and yoke 3' to each other and to the bracket 2.

While a measuring instrument as shown in Fig. 2 may be assembled on a magnetic system having a complete annular yoke 3, it is possible and practical to employ a magnetic system as shown in Fig. 3 in which the yoke 3' has an air gap at the region of low flux density opposite the point of mounting of the core and yoke on the bracket 2. This has the advantage that the elements for the magnetic systems of both types of instruments may be manufactured in quantities and stored for assembly with appropriate moving systems according to the received orders for instruments. If desired, the insert 11 may be secured in place to complete the yoke 3' when a conventional moving coil 5 is employed but this is not necessary since the coil does not enter that portion of the annular air gap adjacent the circumferential gap of yoke 3'.

I claim:

1. An electrical measuring instrument comprising a substantially-cylindrical soft iron yoke having a cylindrical bore therethrough, a cylindrical core within said bore, said core having a diameter less than the diameter of the bore and being transversely magnetized to have a plane of maximum magnetization extending through the longitudinal axis of said core, means connecting one side of said core midway between its polar regions to said yoke so that the core will be spaced from the yoke by an annular air gap, and a coil system movable with respect to said core and said yoke including a substantially-flat main coil surrounding said core and having two parallel coil sides in said air gap, said coil sides being parallel to the longitudinal axis of said core, and a substantially-flat auxiliary coil mounted upon said yoke with one coil side in said air gap and a parallel coil side adjacent the outer surface of said yoke, said auxiliary coil being rigidly connected to said main coil at one side thereof and lying in a plane normal to the plane of said main coil.

2. An electrical measuring instrument as defined in claim 1 wherein the moving system further includes a pointer in the plane of said auxiliary coil rigidly secured to said main coil on the side thereof opposite said auxiliary coil.

3. An electrical measuring instrument as defined in claim 2 wherein the yoke has a removably secured section extending from the inner periphery to the outer periphery of said yoke opposite said means for connecting the core to the yoke to provide means for mounting said auxiliary coil upon said yoke.

References Cited in the file of this patent

UNITED STATES PATENTS

| | | |
|---|---|---|
| 1,171,907 | Trent | Feb. 15, 1916 |
| 1,920,764 | Nickle | Aug. 1, 1933 |
| 2,443,073 | Knudsen | June 8, 1948 |
| 2,518,609 | Fogle | Aug. 15, 1950 |

FOREIGN PATENTS

| | | |
|---|---|---|
| 112,990 | Great Britain | Feb. 4, 1918 |